US008495590B2

(12) United States Patent
Bates

(10) Patent No.: US 8,495,590 B2
(45) Date of Patent: Jul. 23, 2013

(54) USER-SPECIFIC SOFTWARE DEBUGGING

(75) Inventor: Cary L. Bates, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 13/157,443

(22) Filed: Jun. 10, 2011

(65) Prior Publication Data

US 2012/0317552 A1    Dec. 13, 2012

(51) Int. Cl.
*G06F 9/44* (2006.01)
(52) U.S. Cl.
USPC ........... 717/129; 715/810; 717/105; 717/125; 717/126
(58) Field of Classification Search
None
See application file for complete search history.

(56) References Cited

U.S. PATENT DOCUMENTS

| | | | |
|---|---|---|---|
| 6,493,868 B1 * | 12/2002 | DaSilva et al. | 717/105 |
| 6,961,926 B2 * | 11/2005 | Koyama | 717/129 |
| 7,047,519 B2 * | 5/2006 | Bates et al. | 717/129 |
| 7,461,368 B2 * | 12/2008 | White | 717/129 |
| 7,484,203 B2 * | 1/2009 | Drake | 717/126 |
| 8,136,093 B2 * | 3/2012 | White | 717/125 |
| 2007/0240125 A1 * | 10/2007 | Degenhardt et al. | 717/129 |
| 2008/0133977 A1 | 6/2008 | Chun et al. | |
| 2011/0258579 A1 * | 10/2011 | Nanjundaswamy | 715/810 |

OTHER PUBLICATIONS

Brent, Hailpern, "Software debugging, testing, and verification", 2002, IBM Research Division, vol. 41, pp. 4-12, <http://ieeexplore.ieee.org/stamp/stamp.jsp?tp=&arnumber=5386906>.*
Thomas, Ball, "The SLAM project: debugging system software via static analysis", Jan. 2002, ACM, vol. 37, pp. 1-3, <http://delivery.acm.org/10.1145/510000/503274/p1-ball.pdf>.*
Fujii, Toshiya, "A Software Accelerated Life Testing Model", 2010, Graduate School of Engineering Hiroshima University, pp. 85-92, <http://ieeexplore.ieee.org/stamp/stamp.jsp?tp=&arnumber=5703231&tag=1>.*
Chintakovid, Thippaya, "Pair Collaboration in End-User Debugging", 2006, Drexel University, pp. 3-10, <http://ieeexplore.ieee.org/stamp/stamp.jsp?tp=&arnumber=1698755>.*
U.S. Appl. No. 13/085,628, filed Apr. 13, 2011.
U.S. Appl. No. 13/028,269, filed Feb. 16, 2011.
U.S. Appl. No. 13/085,647, filed Apr. 13, 2011.
U.S. Appl. No. 13/085,725, filed Apr. 13, 2011.
Sidwell, et al., "Non-Stop Multi-Threaded Debugging in GDB", GCC Developers' Summit 2008, pp. 1-11, CodeSourcery Inc, Ottawa, Canada.

* cited by examiner

*Primary Examiner* — Thuy Dao
*Assistant Examiner* — Khanh Dang
(74) *Attorney, Agent, or Firm* — Biggers & Ohanian LLP

(57) ABSTRACT

User-specific software debugging with user-specific step commands that includes: receiving a command to step execution to a source code module associated with a user; identifying routines in a call stack associated with the user; inserting, for each identified routine, a breakpoint at each source code line of the routine; inserting, for each source code module associated with the user and not in the call stack, a breakpoint at an entry point of the source code module; and executing the debuggee until the debuggee encounters one of the inserted breakpoints thereby halting execution of the debuggee. User-specific debugging with user-specific Dynamically Linked Library (DLL) load processing modes including: receiving a selection of a user-specific DLL processing mode; upon loading a DLL, retrieving a user identification; determining whether the DLL is associated with the user; and processing the DLL in accordance with user specific DLL processing mode only if the DLL is associated with the user.

7 Claims, 11 Drawing Sheets

USER-SPECIFIC SOFTWARE DEBUGGING

BACKGROUND OF THE INVENTION

1. Field of the Invention

The field of the invention is data processing, or, more specifically, methods, apparatus, and products for user-specific software debugging.

2. Description of Related Art

The development of the Electronic Discrete Variable Automatic Computer (EDVAC) computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

As software sophistication increases so also does the complexity of software debugging. In today's software development environments, for example, many different individuals—users—may collaborate to develop a single software applications. Some users may work on one particular portion of the source code while other users may be responsible for a different section. Software development by these users may include large amounts of software debugging. As such, any increase in efficiency of software debugging reduces overall software development costs. At present, software debugging tools do not provide or employ efficient—if any—user-specific debugging techniques.

SUMMARY OF THE INVENTION

Methods, apparatus, and products for user-specific software debugging carried out by a debugger are described in this specification. One user-specific software debugging technique described in this specification includes: receiving, from a user registered in a debug session of a debuggee, a selection of a user-specific dynamically linked library ('DLL') processing mode; upon loading a DLL during execution of the debuggee: retrieving an identification of the registered user; determining, in dependence upon the user identification, whether the DLL is associated with the registered user; if the DLL is associated with the user, processing the DLL in accordance with user-specific DLL processing mode; and if the DLL is not associated with the user, continuing execution of the debuggee without processing the DLL.

Another user-specific software debugging technique described in this specification includes: receiving, from a user, a command to step execution of a debuggee to a source code module of the debuggee associated with the user; responsive to the command: identifying each routine in a call stack comprising a source code module associated with the user; inserting, for each routine comprising a source code module associated with the user, a breakpoint at each line of source code of the routine; inserting, for each source code module associated with the user and not in the call stack, a breakpoint at an entry point of the source code module; and executing the debuggee until the debuggee encounters one of the inserted breakpoints thereby halting execution of the debuggee.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
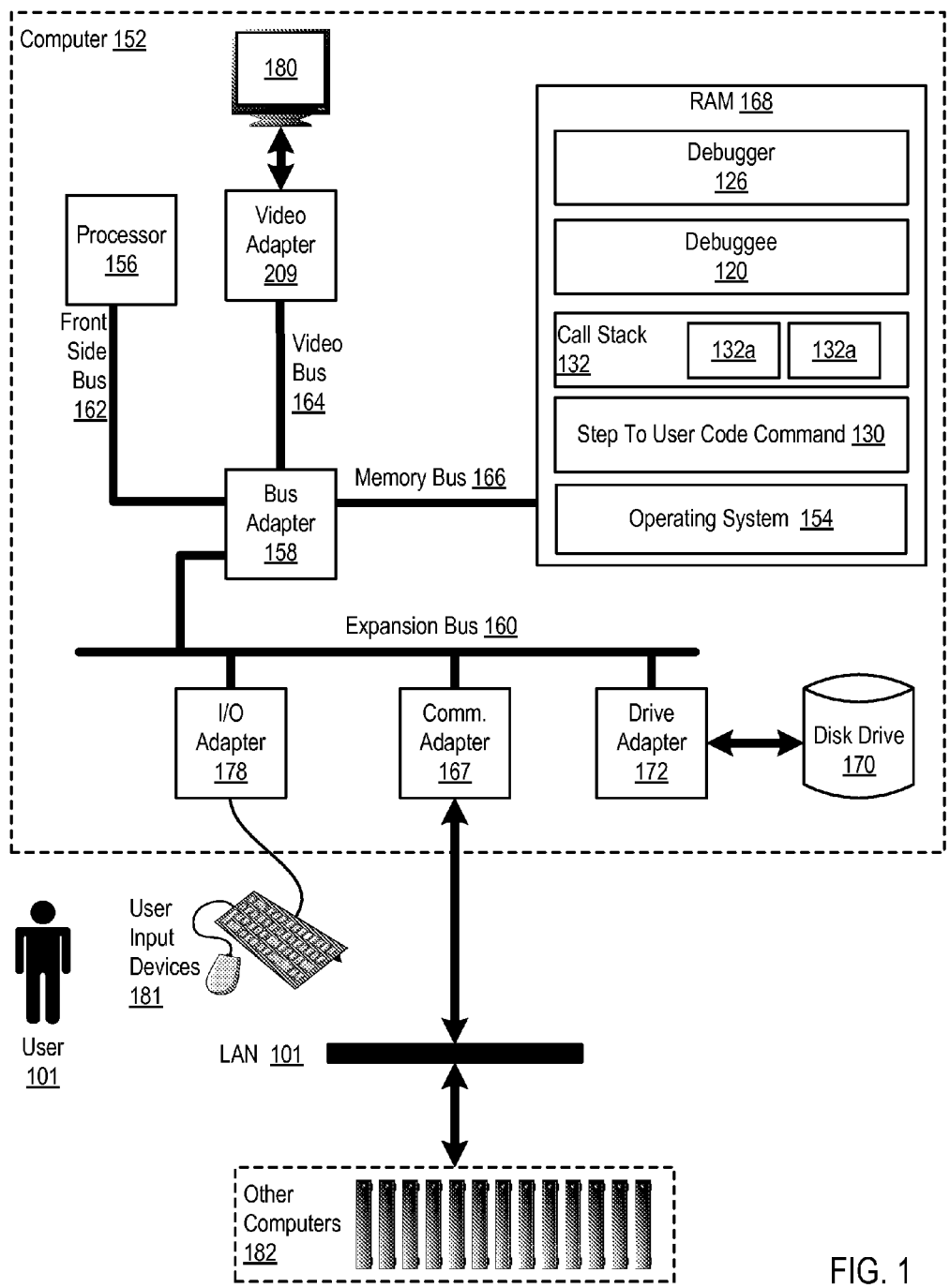
FIG. 1 sets forth a block diagram of a system for user-specific software debugging according to embodiments of the present invention.

Exemplary methods, apparatus, and products for user-specific software debugging in accordance with the present invention are described with reference to the accompanying drawings, beginning with FIG. 1. FIG. 1 sets forth a block diagram of a system for user-specific software debugging according to embodiments of the present invention. The system of FIG. 1 includes automated computing machinery comprising an exemplary computer (152) useful in user-specific software debugging according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) are a debugger (126) and a debuggee (120). A debugger (126) is an application that controls operation of another application—the debuggee (120)—for the purpose of testing execution of the debuggee. The source code of the debuggee may run on an instruction set simulator (ISS), a technique that allows great power in its ability to halt when specific conditions are encountered but which will typically be somewhat slower than executing the code directly on a processor for which the code is written. When execution of a program crashes or reaches a preset condition, a debugger typically displays the position in the source code at which the execution of the program crashed. A 'crash' occurs when the program cannot normally continue because of a programming bug. In addition to displaying a position in source code when execution of the source code crashes, debuggers also often offer other functions such as running a program step by step (single-stepping or program animation), stopping, breaking, or pausing the program to examine the current state, at some event or specified instruction by means of a breakpoint, and tracking the values of some variables.

In the example system of FIG. 1, the debugger (126) presents a graphical user interface ('GUI') as a front-end of the debugger (126). Front-ends are extensions to debugger engines that provide Integrated Development Environment ('IDE') integration, program animation, and visualization features, rather than console-based command line interfaces. The 'front-end' directly faces a client—or user—in contrast to the debugger (126) in the example of FIG. 1, which interfaces indirectly with the clients through the GUI.

The debugger (126) in the example of FIG. 1 is also configured for user-specific software debugging in accordance with embodiments of the present invention. User-specific software debugging in accordance with embodiments of the present invention may include receiving, from a user (101), a command (130) to step execution of the debuggee (120) to a source code module of the debuggee associated with the user. A step command, when executed by the debugger, causes the debugger to execute a single statement or line of source code of the debuggee. There are several types of step commands including a 'step into' command, a 'step over' command, and a 'step out' command. The 'step into' command causes the debugger to execute a single line of source code, and if the line includes function call, the function is entered and execution is halted. The 'step over' command causes the debugger to execute a single line of source code, and if the line includes a function call, the function is entered, executed, and execution of the debuggee halts after returning from the function. The 'step out' command may be used in conjunction with the 'step into' command. Once execution is halted in a function as a result of a 'step into' command, carrying out a 'step out' command causes the debugger to resume execution of the debuggee through the function, until execution is halted after returning from the function. Step commands in the prior art are configured to be user-agnostic. That is, when executing a prior art step command, the debugger operation does not take into account, any user identification or association of a user to a module of source code. The debugger executes the next statement, or line of source code, regardless of the statements' association with a user. By contrast to debugger operation of a step command in the prior art, the example debugger of FIG. 1 is improved to carry out user-specific step commands as described below in more detail.

In the example of FIG. 1, one or more source code modules are associated with the user (101). A source code module may be any portion of source code—a basic block, a particular routine, a line of source code, a predefined segment of source code, and so on. The module may be 'associated' with the user in various ways. A source code module, for example, may be associated with the user by: being originally composed by the user; by being modified most recently modified by the user; by explicit assignment by the user or another user; and in other ways as will occur to readers of skill in the art.

The example debugger (126) in FIG. 1 continues user-specific software debugging by, responsive to the command (130), identifying each routine (132a) in a call stack (132) that includes a source code module associated with the user (101), inserting, for each routine (132a) that includes a source code module associated with the user (101), a breakpoint at each line of source code of the routine, and inserting, for each source code module associated with the user and not in the call stack (132), a breakpoint at an entry point of the source code module. After the breakpoints are inserted, the debugger (126) may then execute the debuggee (120) until the debuggee (120) encounters one of the inserted breakpoints thereby halting execution of the debuggee (120). The debugger then causes execution of the debuggee to continue from a current point in source code to a portion of source code associated with the user, without halting at other user's source code.

Also stored in RAM (168) is an operating system (154). Operating systems useful in user-specific software debugging according to embodiments of the present invention include UNIX™ Linux™ Microsoft XP™, AIX™ IBM's i™, and others as will occur to those of skill in the art. The operating system (154), debugger (126), debuggee (126), and GUI (124) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers that operate for user-specific software debugging according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user (101) input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for user-specific software debugging according to embodiments of the present invention include modems for wired dial-up communications, Ethernet (IEEE 802.3) adapters for wired data communications network communications, and 802.11 adapters for wireless data communications network communications.

The arrangement of computers, networks, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
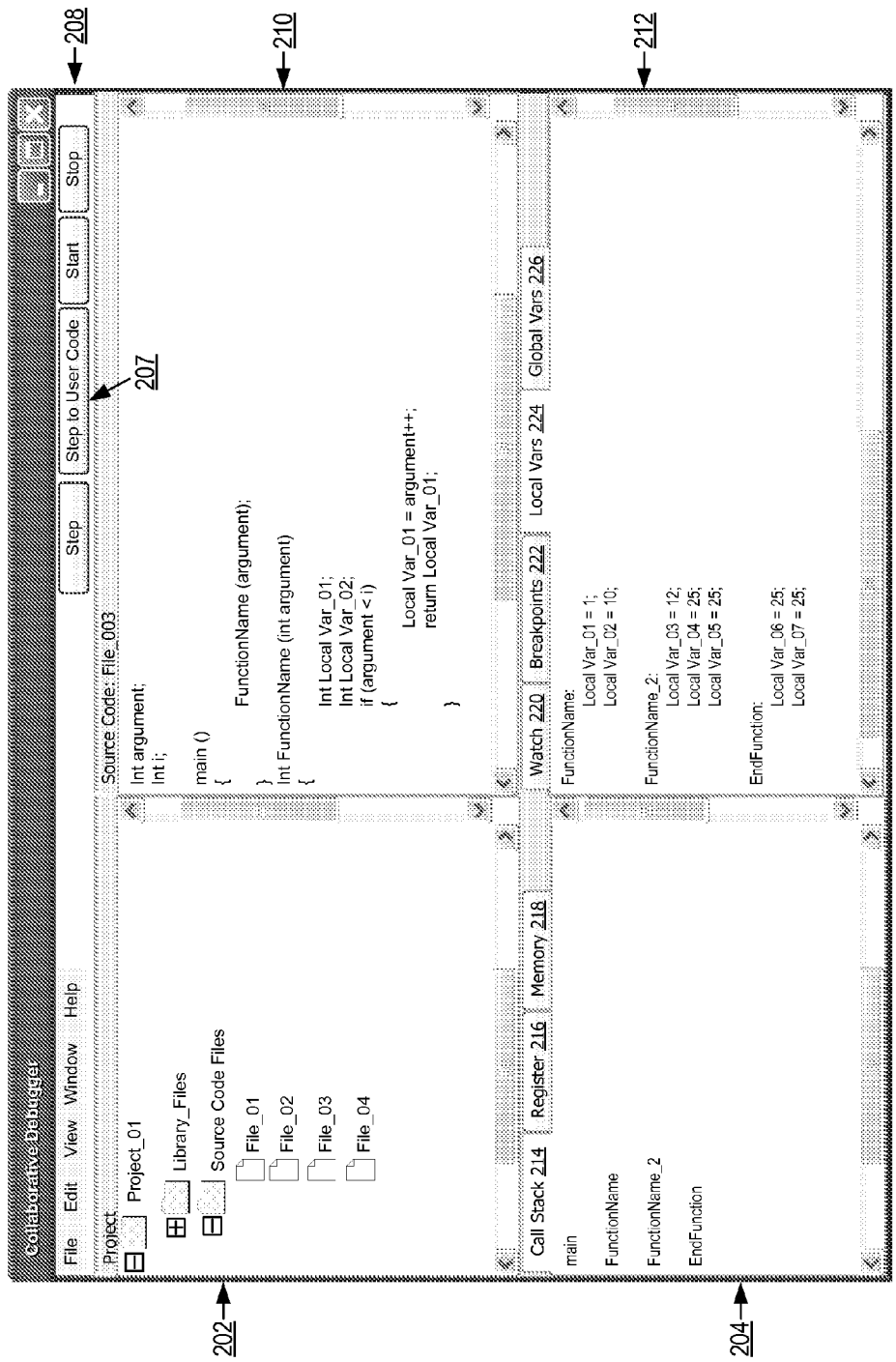
FIG. 2 sets forth an example GUI presented to a user by a debugger configured for user-specific software debugging in accordance with embodiments of the present invention.

For further explanation, FIG. 2 sets forth an example GUI (124) presented to a user by a debugger configured for user-specific software debugging in accordance with embodiments of the present invention. The example GUI (124) of FIG. 2 provides an interface for a user to control operation of a debugger that supports user-specific software debugging.

The example GUI (124) of FIG. 2 includes a menu bar (208) that, in turn, includes a number of separate menus: a File menu, an Edit menu, a View menu, Options menu, and a Help menu. In the menu bar (208) are several GUI buttons: a Step button, a start button, a stop button, and a step to user code button (207). When the step to user code button (207) is invoked by a user, the GUI (124) generates a command to step execution of a debuggee to a source code module of the debuggee associated with the user and forwards that command to the debugger presenting the GUI (124) of FIG. 2. The debugger receives the command and, responsive to the command: identifies each routine in a call stack (214) that includes a source code module associated with the user; inserts, for each routine that includes a source code module associated with the user, a breakpoint at each line of source code of the routine; and inserts, for each source code module associated with the user and not in the call stack, a breakpoint at an entry point of the source code module; and executes the debuggee until the debuggee encounters one of the inserted breakpoints thereby halting execution of the debuggee.

The example GUI (124) of FIG. 2 also includes several independent portions—called panes (as in 'window panes') for clarity of explanation—a project pane (202), a source code pane (210), and two separate data panes (204, 212). Project pane (202) presents the files and resources available in a particular software development project. Source code pane (210) presents the source code of the debuggee. The data panes (204, 212) present various data useful in debugging the source code. In the example of FIG. 2, data pane (204) includes four tabs, each of which presents different data: a call stack tab (214), a register tab (214), a memory tab (218), and an event queue (230) tab. Data pane (212) includes four tabs: a watch list tab (220), a breakpoints (222) tab, a local variable tab (224), and a global variable tab (226).

The GUI items, menus, window panes, tabs, and so on depicted in the example GUI (124) of FIG. 2, are for explanation, not for limitation. Other GUI items, menu bar menus, drop-down menus, list-boxes, window panes, tabs, and so on as will occur to readers of skill in the art may be included in GUIs presented by debuggers that support user-specific software debugging in accordance with embodiments of the present invention.

Figure 3:
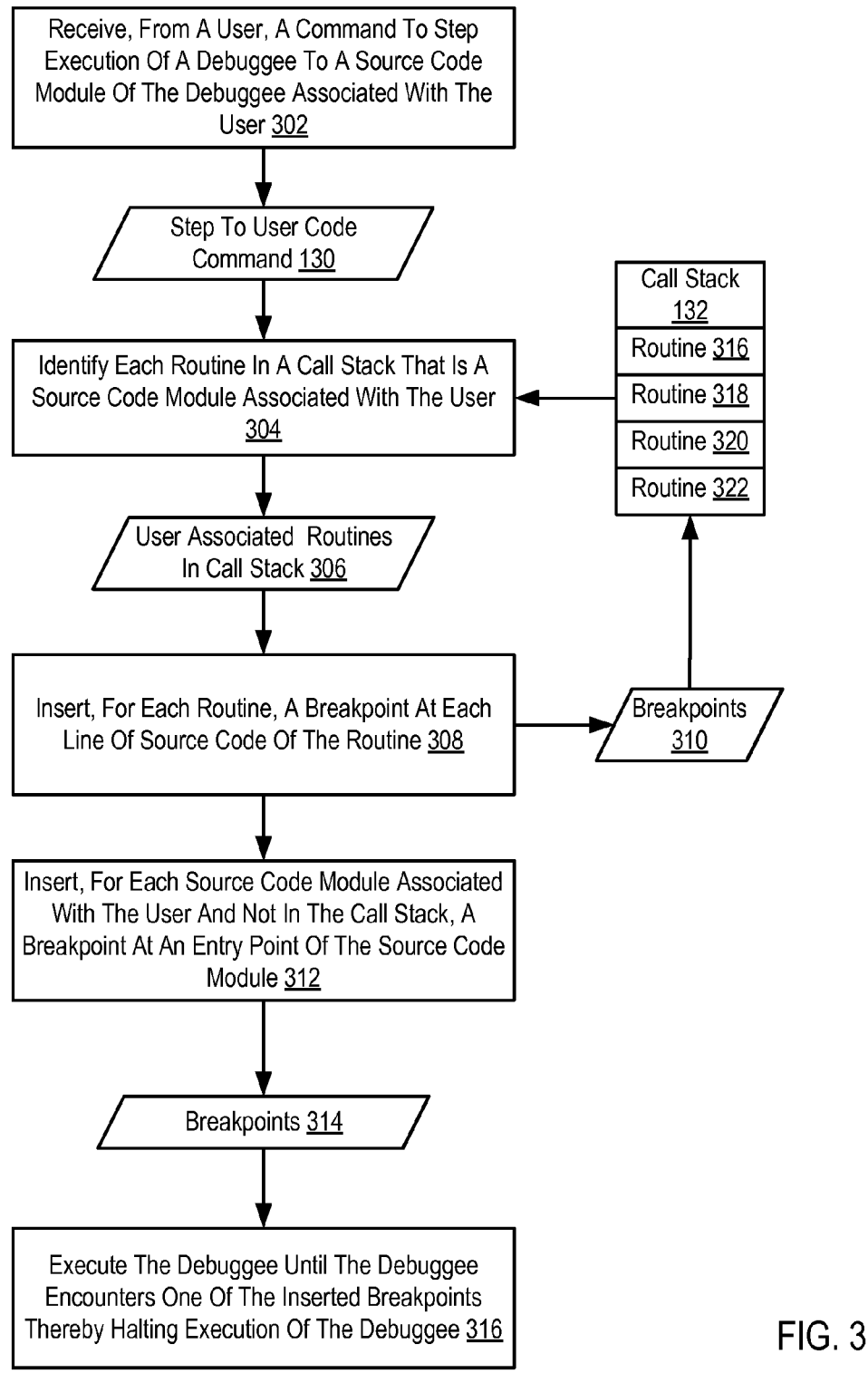
FIG. 3 sets forth a flow chart illustrating an exemplary method for user-specific software debugging according to embodiments of the present invention.

For further explanation, FIG. 3 sets forth a flow chart illustrating an exemplary method for user-specific software debugging according to embodiments of the present invention. The method of FIG. 3 is carried out by a debugger similar to the debugger depicted in the example system of FIG. 1. The method of FIG. 3 includes receiving (302), from a user, a command (130) to step execution of a debuggee to a source code module of the debuggee associated with the user. Receiving (302) a command (130) to step execution of a debuggee to a source code module of the debuggee associated with the user may be carried out by receiving a command generated by a GUI upon the user invoking a GUI object—such as a GUI button—designated for the purpose of generating such user-specific step commands (130).

The method of FIG. 3 continues, responsive to the command, by identifying (304) each routine (316, 318, 320, 322) in a call stack (132) comprising a source code module associated with the user. The method of FIG. 3 also includes inserting (308), for each routine (316, 318, 320, 322) comprising a source code module associated with the user, a breakpoint (310) at each line of source code of the routine and inserting (308), for each source code module associated with the user and not in the call stack, a breakpoint (314) at an entry point of the source code module. Inserting a breakpoint may be carried out in various ways including, replacing original machine instructions of the routine with a predefined value or expression that when executed will cause execution of the debuggee to halt and control to return to the debugger.

The method of FIG. 3 continues by executing (316), by the debugger, the debuggee until the debuggee encounters one of the inserted breakpoints (310, 314) thereby halting execution of the debuggee. After, execution of the debuggee halts due to encountering one of the inserted breakpoints, the debugger may remove each of the inserted breakpoints. In this way, the debuggee runs to the next portion of debuggee source code associated with the user, regardless of whether the next portion of the debuggee is the next line of source code.

Figure 4:
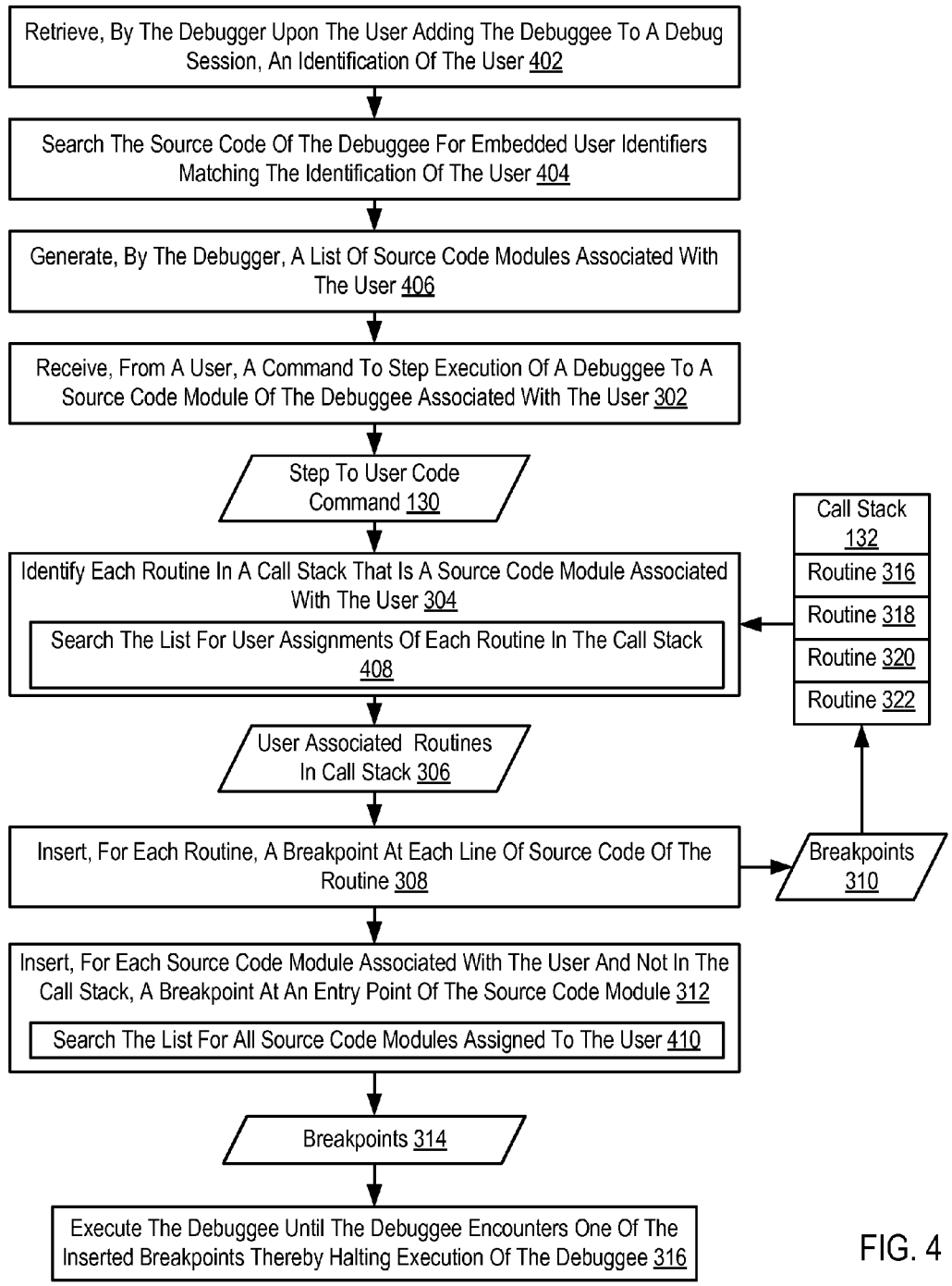
FIG. 4 sets forth a flow chart illustrating a further exemplary method for user-specific software debugging according to embodiments of the present invention.

For further explanation, FIG. 4 sets forth a flow chart illustrating a further exemplary method for user-specific software debugging according to embodiments of the present invention. The method of FIG. 4 is similar to the method of FIG. 3 in that the method of FIG. 4 also includes: receiving (302) a command (130) to step execution to a source code module associated with the user; and responsive to the command: identifying (304) each routine (316, 318, 320, 322) in a call stack (132) comprising a source code module associated with the user; inserting (308), for each routine (316, 318, 320, 322) comprising a source code module associated with the user, a breakpoint (310) at each line of source code of the routine; inserting (308), for each source code module associated with the user and not in the call stack, a breakpoint (314) at an entry point of the source code module; and executing (316) the debuggee until the debuggee encounters one of the inserted breakpoints (310, 314) thereby halting execution of the debuggee.

The method of FIG. 4 differs from the method of FIG. 3, however, in that the method of FIG. 4 includes retrieving (402), by the debugger upon the user adding the debuggee to a debug session, an identification of the user. An identification of a user may be derived from an identification of a computer upon which the debugger is executing, may be provided to the debugger directly by the user upon instantiating a debug session, or may be generated in other ways.

The method of FIG. 4 also includes searching (404) the source code of the debuggee for embedded user identifiers matching the identification of the user. That is, in some embodiments, the source code includes embedded user identifiers. Such identifiers may be embedded explicitly by a user such as, for example, in a comment to a line of source code, may be embedded implicitly—that is, without direct interaction by the user—by a software development tool during software development, or may be embedded in other ways. Each embedded user identifier represents a source code module user assignment. A 'user assignment' as the term is used here refers to an association between a source code module and a user.

The method of FIG. 4 also includes generating (406), by the debugger, a list of source code modules associated with the user. The list may be generated only for a single user—the current user—or may include associations of source code modules with a number of users.

In the method of FIG. 4, identifying (304) each routine in a call stack that includes a source code module associated with the user includes searching (408) the list for user assignments of each routine in the call stack and inserting (312), for each source code module associated with the user and not in the call stack, a breakpoint at an entry point of the source code module includes searching (410) the list for all source code modules assigned to the user.

Figure 5:
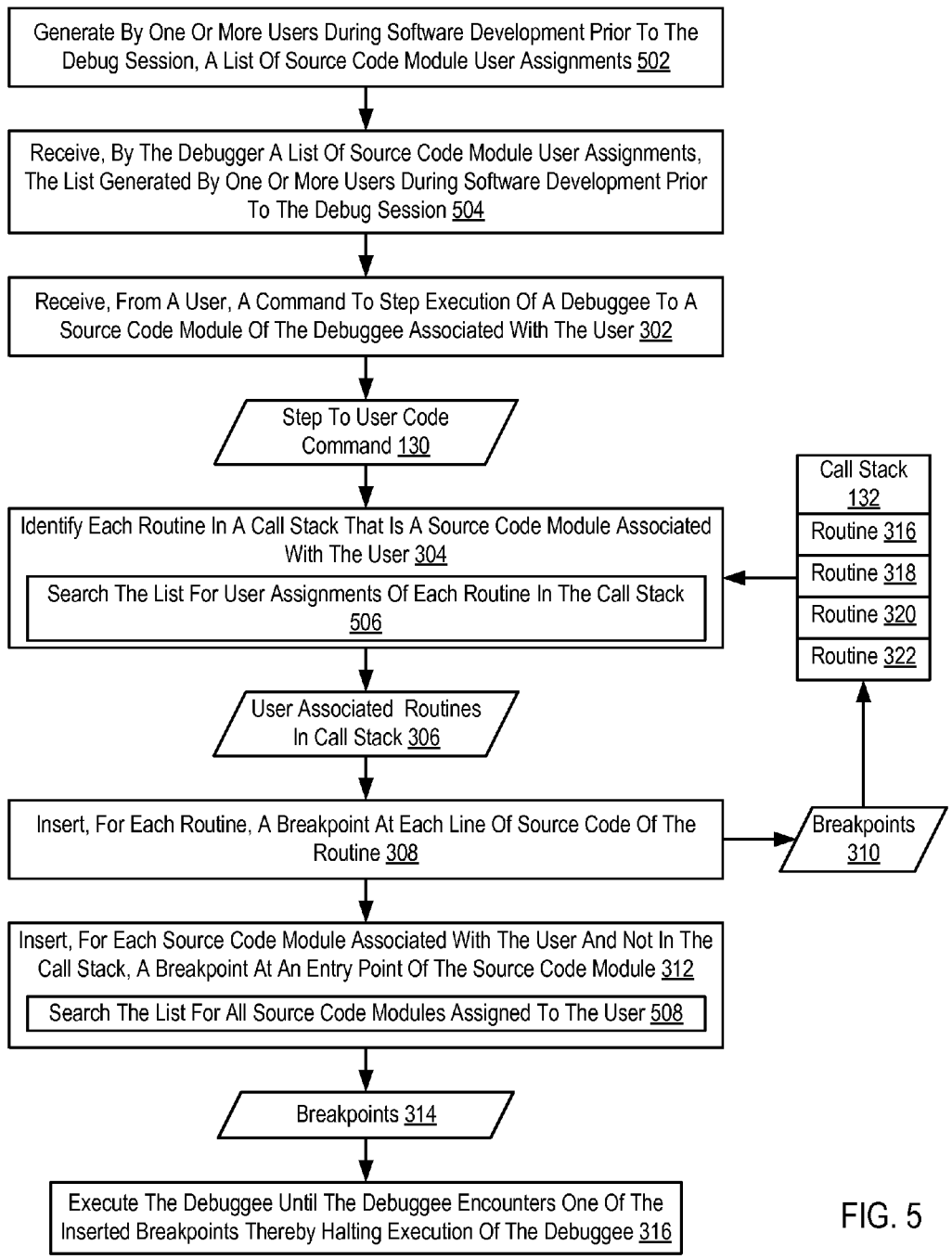
FIG. 5 sets forth a flow chart illustrating a further exemplary method for user-specific software debugging according to embodiments of the present invention.

For further explanation, FIG. 5 sets forth a flow chart illustrating a further exemplary method for user-specific software debugging according to embodiments of the present invention. The method of FIG. 5 is similar to the method of FIG. 3 in that the method of FIG. 5 also includes: receiving (302) a command (130) to step execution to a source code module associated with the user; and responsive to the command: identifying (304) each routine (316, 318, 320, 322) in a call stack (132) comprising a source code module associated with the user; inserting (308), for each routine (316, 318, 320, 322) comprising a source code module associated with the user, a breakpoint (310) at each line of source code of the routine; inserting (308), for each source code module associated with the user and not in the call stack, a breakpoint (314) at an entry point of the source code module; and executing (316) the debuggee until the debuggee encounters one of the inserted breakpoints (310, 314) thereby halting execution of the debuggee.

The method of FIG. 5 differs from the method of FIG. 3, however, in that the method of FIG. 5 includes receiving (504), by the debugger a list of source code module user assignments, the list generated by one or more users during software development prior to the debug session. That is, one or more users may explicitly specify source code module associations. Such a specification may occur in various ways including, for example, by selecting a number of source code lines, a routine, or the like, in a debugger or software development tool GUI, selecting a GUI option to assign a user to the selected source code, and providing a user identification to the GUI. The GUI may generate and store the list for later use.

In the method of FIG. 5, identifying (304) each routine in a call stack that includes a source code module associated with the user includes searching (506) the list for user assignments of each routine in the call stack and inserting (312), for each source code module associated with the user and not in the call stack, a breakpoint at an entry point of the source code module includes searching (508) the list for all source code modules assigned to the user.

Figure 6:
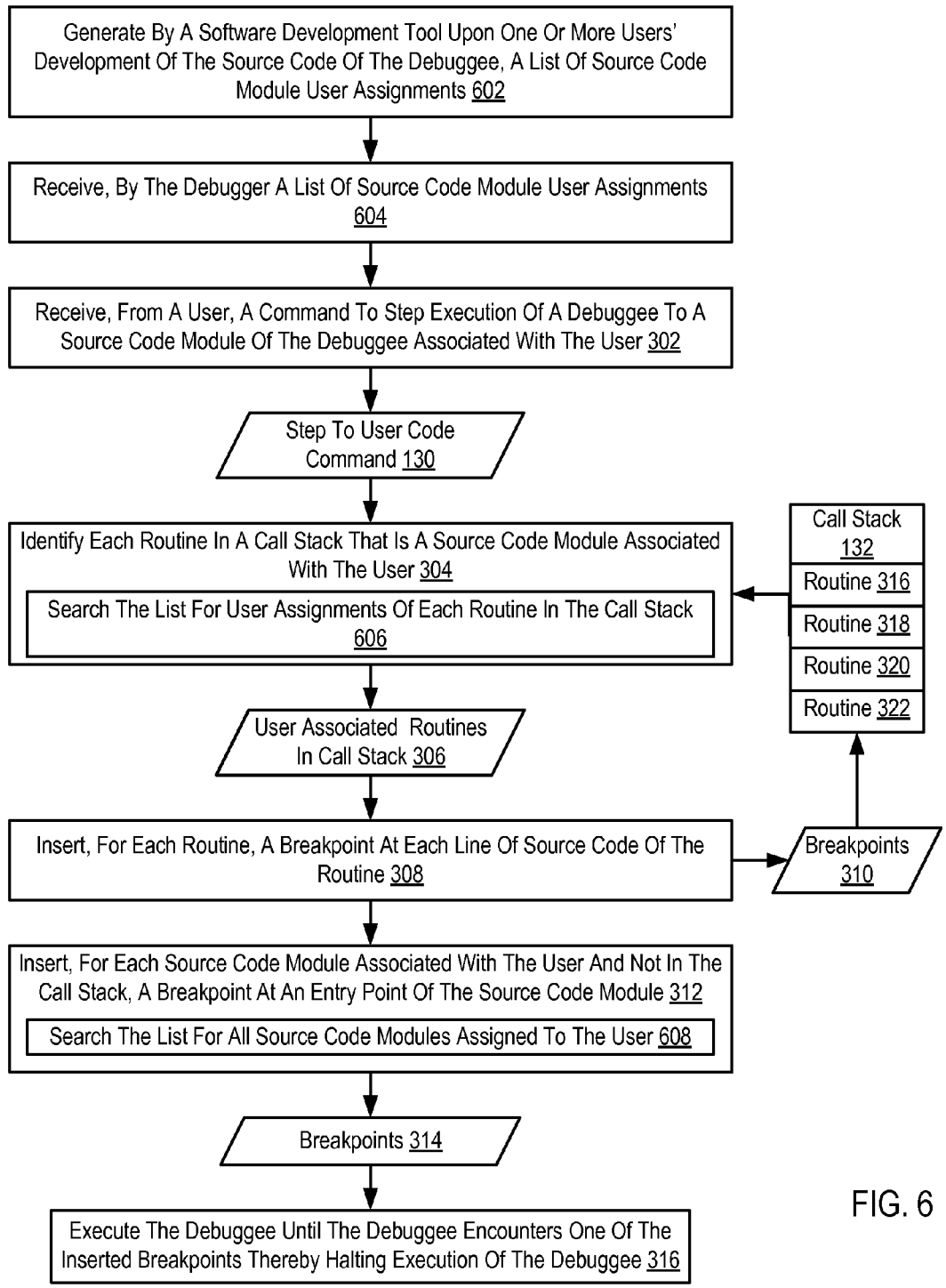
FIG. 6 sets forth a flow chart illustrating a further exemplary method for user-specific software debugging according to embodiments of the present invention.

For further explanation, FIG. 6 sets forth a flow chart illustrating a further exemplary method for user-specific software debugging according to embodiments of the present invention. The method of FIG. 6 is similar to the method of FIG. 3 in that the method of FIG. 6 also includes: receiving (302) a command (130) to step execution to a source code module associated with the user; and responsive to the command: identifying (304) each routine (316, 318, 320, 322) in a call stack (132) comprising a source code module associated with the user; inserting (308), for each routine (316, 318, 320, 322) comprising a source code module associated with the user, a breakpoint (310) at each line of source code of the routine; inserting (308), for each source code module associated with the user and not in the call stack, a breakpoint (314) at an entry point of the source code module; and executing (316) the debuggee until the debuggee encounters one of the inserted breakpoints (310, 314) thereby halting execution of the debuggee.

The method of FIG. 6 differs from the method of FIG. 3 in that the method of FIG. 6 includes generating (502) by a software development tool upon one or more users' development of the source code of the debuggee, a list of source module user assignments and receiving (504), by the debugger, the list of source code module user assignments, the list generated by a software development tool upon one or more users' development of the source code of the debuggee. A software development tool is any module of automated computing machinery that includes software and computer hardware to aid in developing source code for compilation and execution by a computer. Software development tools may be stand alone modules designated solely for the purpose of receiving text representing source code. Software development tools may also be implemented with many modules—a compiler, for example. In some embodiments, a software development tool may be implemented as an Integrated Development Environment ('IDE') that also includes the debugger itself.

The software development tool may generate the list of source code user assignments in various ways including, for example: by associating every line of source code with a user identifier of the user creating the line of source code, by associating functions or routines of source code with a user identifier of the user creating the function or the routine, by associating a module of source code with a user identifier of the user that most recently modified source code of the module, and in other ways as will occur to readers of skill in the art. The software development tool may carry out the generation of the source code user assignment list in manner that is invisible from the user's perspective. In this way, the generation may be referred to as an implicit, rather than explicit, generation of a source code user assignment list.

In the method of FIG. 6, once the source user assignment list is received by the debugger, identifying (304) each routine in a call stack that includes a source code module associated with the user includes searching (606) the list for user assignments of each routine in the call stack and inserting (308), for each source code module associated with the user and not in the call stack, a breakpoint at an entry point of the source code module includes searching (608) the list for all source code modules assigned to the user.

Figure 7:
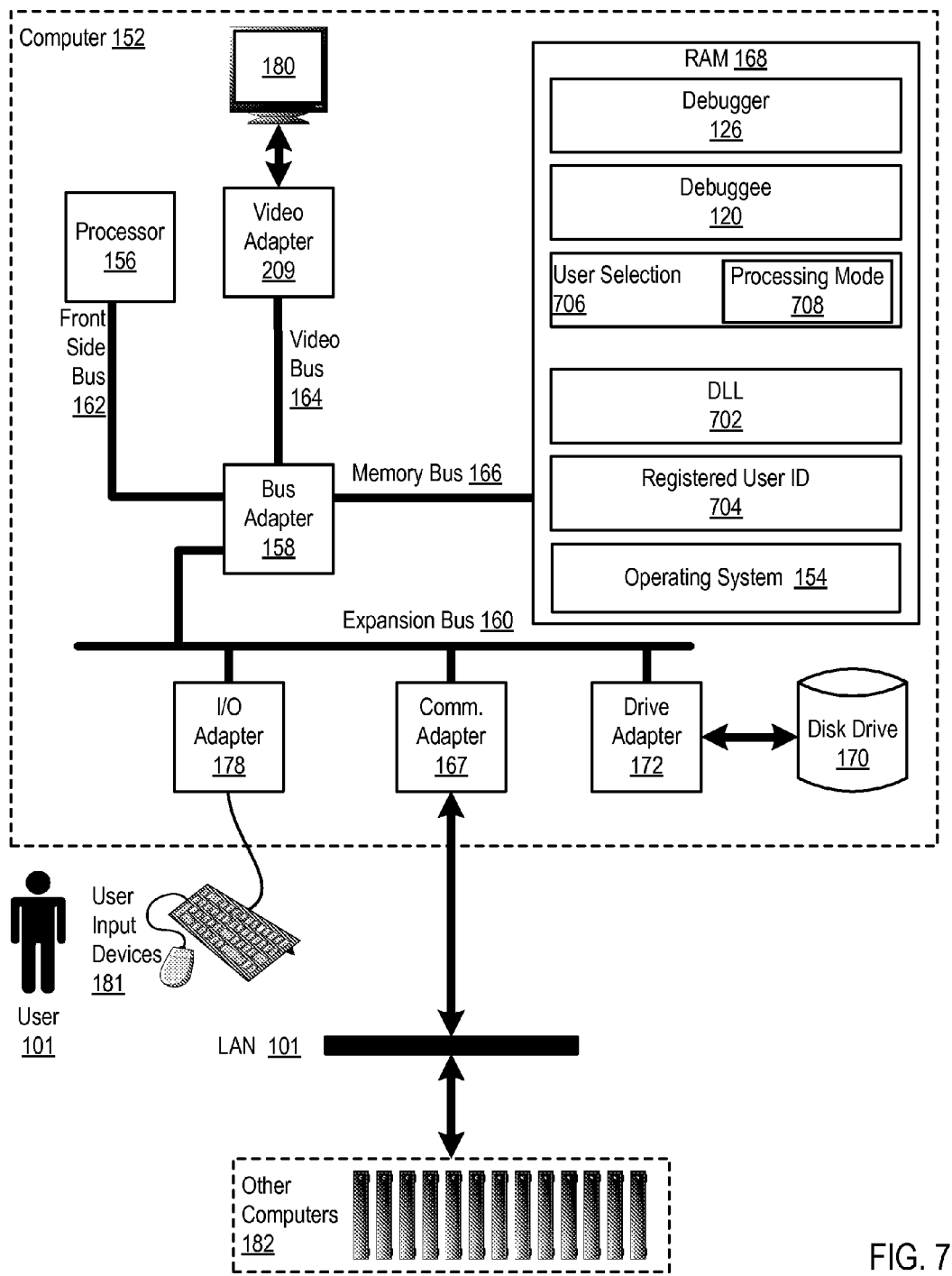
FIG. 7 sets forth a block diagram of another system for user-specific software debugging according to embodiments of the present invention.

While user-specific step commands are discussed above as one aspect of user-specific software debugging in accordance with embodiments of the present invention, another aspect of user-specific software debugging in accordance with embodiments of the present invention is described below, beginning with FIG. 7. FIG. 7 sets forth a block diagram of another system for user-specific software debugging according to embodiments of the present invention. The system of FIG. 7 is similar to the system of FIG. 1 and like parts (RAM, CPU, Video Adapter, BUS adapter, busses, etc.) have similar reference numerals.

Also like the system of FIG. 1, stored in RAM (168) of the example system of FIG. 7 is a debugger (126) and a debuggee (120). The system of FIG. 7 differs the system of FIG. 1 however, in that in the system of FIG. 7, the debugger (126) is configured user-specific software debugging that supports user-specific dynamically linked library ('DLL') processing in accordance with embodiments of the present invention. The debugger (126) in the example of FIG. 7 carries out such user-specific software debugging by receiving, from a user (101) registered in a debug session of the debuggee (120), a selection (706) of a user-specific DLL processing mode (708) and upon loading a DLL (702) during execution of the debuggee (120): retrieving an identification (704) of the registered user (101); determining, in dependence upon the user identification (704), whether the DLL (702) is associated with the registered user (101); if the DLL (702) is associated with the user (101), processing the DLL (702) in accordance with user-specific DLL processing mode (708); and if the DLL (702) is not associated with the user (101), continuing execution of the debuggee without processing the DLL (702).

The term 'processing' when referring to the processing of a DLL refers to debugger operations that occur upon a DLL load. Debuggers of the prior art, for example, may process a DLL upon a DLL load by stopping execution of the debuggee upon each and every load. One user, however, may have no interest in investigating a DLL that is not associated with that user. Each stop of the debuggee on a DLL load that is not associated with the user then, decreases efficiency of software debugging.

Other debuggers of the prior art may be configured to insert, upon a load of a DLL, breakpoints in the loaded DLL at specified functions. A user may specify that the debugger that a breakpoint be inserted in a DLL upon the DLL's load at the function "foo" for example. Different DLLs, however—DLLs not associated with the user, for example—may include a similarly named function. As such, the prior art debugger may insert breakpoints at the similarly named function of a loaded DLL that is not associated with the user.

In contrast to these prior art debugger techniques, the debugger (126) of the present application supports user-specific DLL processing modes. The user selected DLL processing mode is carried out only when the loaded DLL is associated with the user. If the DLL is not associated with the user, the DLL is loaded without any processing—no breakpoints are inserted, no stopping of execution of the debuggee (120).

The arrangement of computers, networks, and other devices making up the exemplary system illustrated in FIG. 7 are for explanation, not for limitation. Data processing systems useful according to various embodiments of the present invention may include additional servers, routers, other devices, and peer-to-peer architectures, not shown in FIG. 7, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 7.

Figure 8:
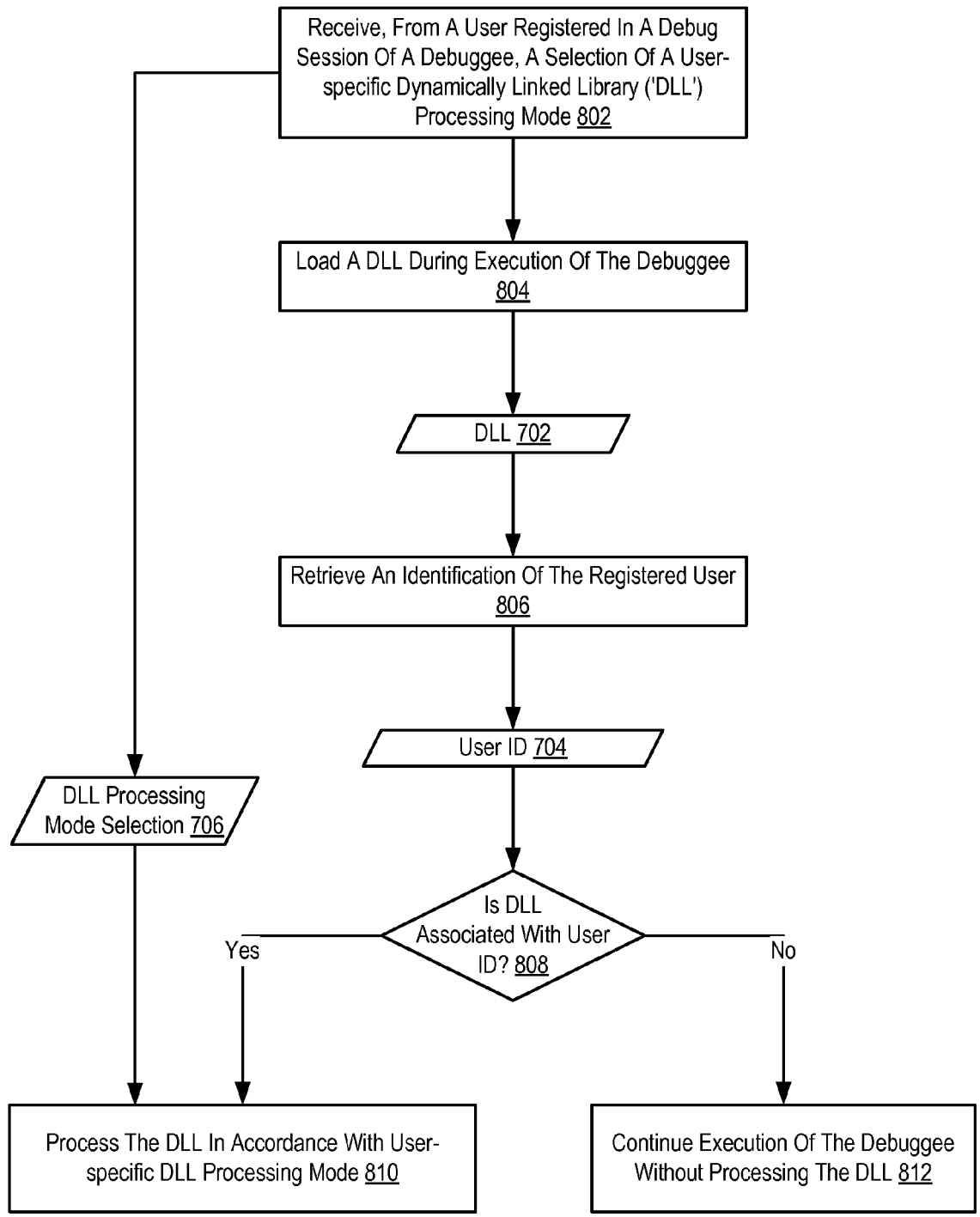
FIG. 8 sets forth a flow chart illustrating an exemplary method for user-specific software debugging according to embodiments of the present invention.

For further explanation, FIG. 8 sets forth a flow chart illustrating an exemplary method for user-specific software debugging according to embodiments of the present invention. The method of FIG. 8 is carried out by a debugger similar to the debugger depicted in the example system of FIG. 7. The method of FIG. 8 includes receiving (802), from a user registered in a debug session of a debuggee, a selection (706) of a user-specific DLL processing mode. Receiving (802) a user selection (706) of a user-specific DLL processing mode may be carried out in various ways including receiving the selection of the mode through one or more GUI items—buttons, options in a drop-down selection list, text, marking of a check box, and so on.

The method of FIG. 8 also includes loading (804) a DLL (702) during execution of the debuggee. A DLL is loaded dynamically at load time or run-time rather than at compile time. A loader, usually a part of the operating system, is responsible for loading the DLLs at load time.

The method of FIG. 8 also includes retrieving (806) an identification (704) of the registered user. Retrieving (806) an identification (704) of the registered user may be carried out in various ways. At initiation of a debug session, for example, the debugger may prompt a user to provide a user identification (704). Alternatively, the user's identification may be derived from information identifying the computer upon which the debugger is executing (such as a Media Access Control or IP address). These are but two ways among many possible ways in which a user's identification may be retrieved. Each was is well within the scope of the present invention.

The method of FIG. 8 also includes determining (808), in dependence upon the user identification (704), whether the DLL is associated with the registered user. Determining (808) whether the DLL is associated with the registered user may be carried out by comparing information describing DLL user assignments to the user identification (704). The DLL may include, for example, embedded user identifications indicating one or more user associations. The debugger may, as another example, be provided, by a software development tool, a list of DLL user assignments. The source files of the debuggee may, for example, include a list of DLL user assignments that set forth user assignments for DLLs which may be loaded during execution of the debuggee.

If the DLL (702) is associated with the user, the method of FIG. 8 continues by processing (810) the DLL (702) in accordance with user-specific DLL processing mode and if the DLL (702) is not associated with the user the method of FIG. 8 continues (812) execution of the debuggee without processing the DLL (702). In this way, loading a DLL not associated with the user does not halt the user's debugging session.

Figure 9:
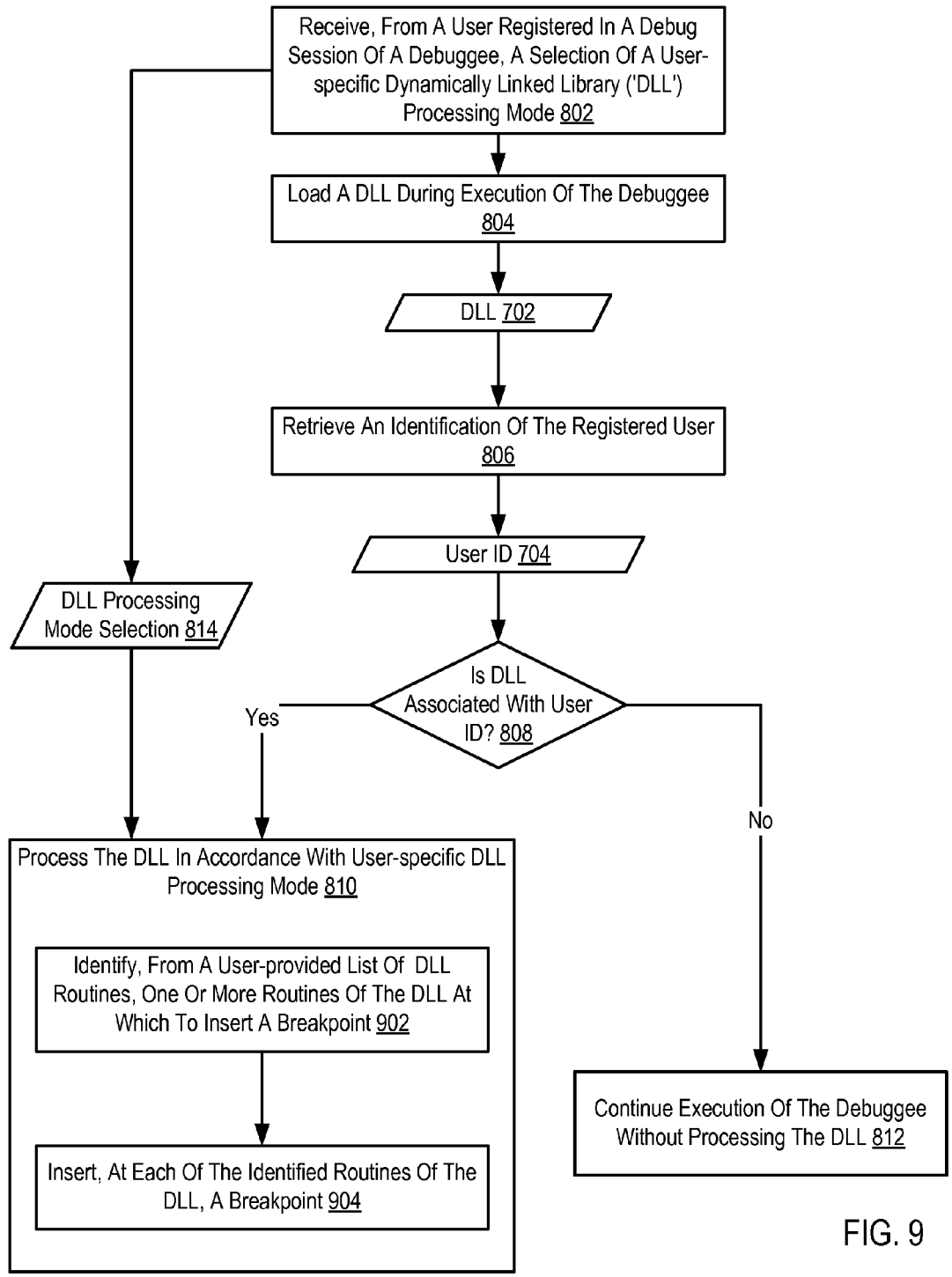
FIG. 9 sets forth a flow chart illustrating a further exemplary method for user-specific software debugging according to embodiments of the present invention.

For further explanation, FIG. 9 sets forth a flow chart illustrating a further exemplary method for user-specific software debugging according to embodiments of the present invention. The method of FIG. 9 is similar to the method of FIG. 8 in that the method of FIG. 9 also includes: receiving (802) a selection (706) of a user-specific DLL processing mode; loading (804) a DLL (702) during execution of the debuggee; retrieving (806) an identification (704) of the registered user; determining (808), in dependence upon the user identification (704), whether the DLL is associated with the registered user; if the DLL (702) is associated with the user, processing (810) the DLL (702) in accordance with user-specific DLL processing mode; and if the DLL (702) is not associated with the user, continuing (812) execution of the debuggee without processing the DLL (702).

The method of FIG. 9 differs from the method of FIG. 8, however, in that in the method of FIG. 9, the user-specific processing mode includes: identifying (902), from a user-provided list of DLL routines, one or more routines of the DLL at which to insert a breakpoint; and inserting (904), at each of the identified routines of the DLL, a breakpoint. In the method of FIG. 9, from the user's perspective, upon loading a DLL associated with the user, the debugger automatically inserts breakpoints at user-specified routines in the DLL associated with the user. Also from the user's perspective: in instances of the method of FIG. 9 in which a DLL is loaded that is not associated with the user, the debugger does not process the DLL and inserts no breakpoints.

Figure 10:
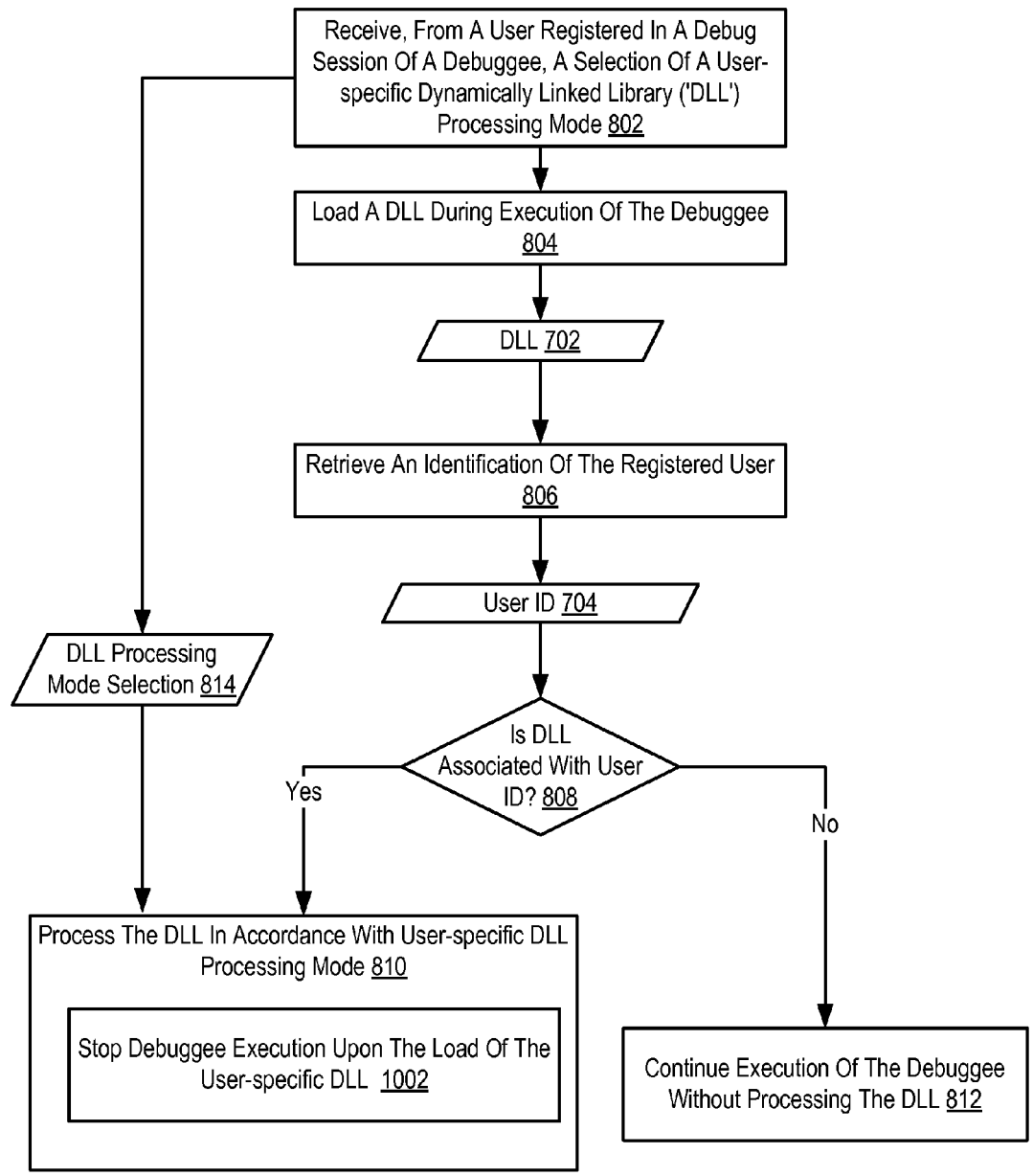
FIG. 10 sets forth a flow chart illustrating a further exemplary method for user-specific software debugging according to embodiments of the present invention.

For further explanation, FIG. 10 sets forth a flow chart illustrating a further exemplary method for user-specific software debugging according to embodiments of the present invention. The method of FIG. 10 is similar to the method of FIG. 8 in that the method of FIG. 10 also includes: receiving (802) a selection (706) of a user-specific DLL processing mode; loading (804) a DLL (702) during execution of the debuggee; retrieving (806) an identification (704) of the registered user; determining (808), in dependence upon the user identification (704), whether the DLL is associated with the registered user; if the DLL (702) is associated with the user, processing (810) the DLL (702) in accordance with user-specific DLL processing mode; and if the DLL (702) is not associated with the user, continuing (812) execution of the debuggee without processing the DLL (702).

The method of FIG. 10 differs from the method of FIG. 8, however, in that in the method of FIG. 10, the user-specific processing mode includes stopping (1002) debuggee execution upon the load of the user-specific DLL. In the method of FIG. 10, from the user's perspective, upon loading a DLL associated with the user, the debugger stops execution of the debuggee. Upon a load of a DLL not associated with the user, execution of the debuggee continues uninterrupted. In this way, a user is provided an opportunity to debug a DLL associated with that user, and efficiency of software debugging is not reduced by stopping execution of the debuggee on loads of DLLs not associated with the user.

Figure 11:
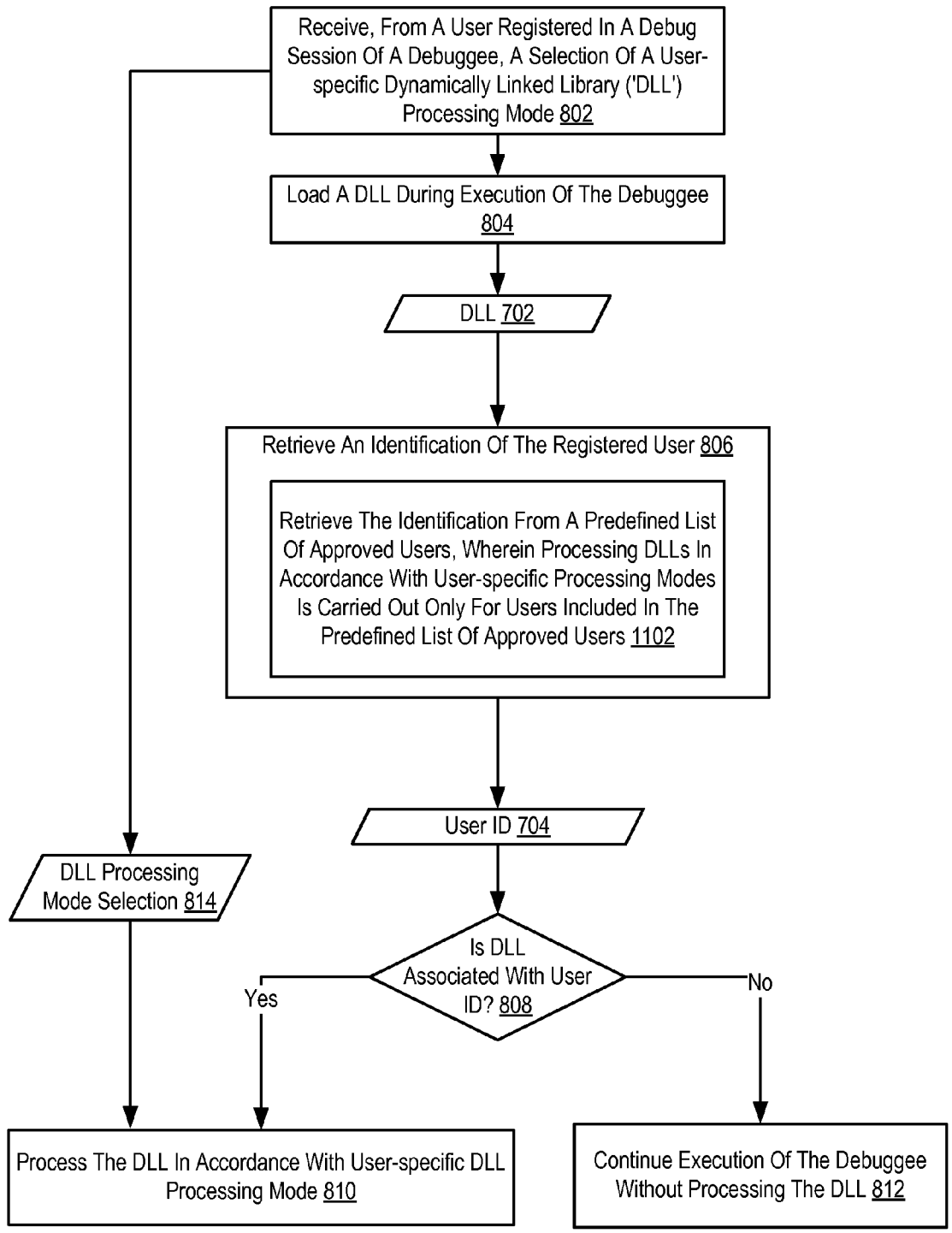
FIG. 11 sets forth a flow chart illustrating a further exemplary method for user-specific software debugging according to embodiments of the present invention.

For further explanation, FIG. 11 sets forth a flow chart illustrating a further exemplary method for user-specific software debugging according to embodiments of the present invention. The method of FIG. 11 is similar to the method of FIG. 8 in that the method of FIG. 11 also includes: receiving (802) a selection (706) of a user-specific DLL processing mode; loading (804) a DLL (702) during execution of the debuggee; retrieving (806) an identification (704) of the registered user; determining (808), in dependence upon the user identification (704), whether the DLL is associated with the registered user; if the DLL (702) is associated with the user, processing (810) the DLL (702) in accordance with user-specific DLL processing mode; and if the DLL (702) is not associated with the user, continuing (812) execution of the debuggee without processing the DLL (702).

The method of FIG. 11 differs from the method of FIG. 8, however, in that in the method of FIG. 11, retrieving (806) an identification of the registered user is carried out by retrieving (1102) the identification (704) from a predefined list of approved users. In the method of FIG. 11, processing (810) DLLs in accordance with user-specific processing modes is carried out only for users included in the predefined list of approved users. The predefined list of approved users may be implemented in various ways including as a list of users working together on a particular software development project, or—in the case of a real-time dynamic collaborative debugging sessions—all or some subset of users currently registered in the collaborative debugging session. These are but a few possible implementations of the predefined list of users. Other implementations are possible and each is well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable transmission medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable transmission medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable transmission medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of user-specific software debugging, the method carried out by a debugger stored in a computer readable memory, the method comprising:
   receiving, from a user, a command to step execution of a debuggee to a source code module of the debuggee associated with the user;
   responsive to the command:
   receiving, by the debugger a list of source code module user assignments, the list generated by one or more users during software development prior to the debug session, wherein identifying each routine in a call stack comprising the source code module associated with the user further comprises searching the list for user assignments of each routine in the call stack
   inserting, for each routine comprising the source code module associated with the user, a breakpoint at each line of source code of the routine;
   inserting, for each of the source code module associated with the user and not in the call stack, a breakpoint at an entry point of the source code module further comprises searching the list for all source code modules assigned to the user; and
   executing the debuggee until the debuggee encounters one of the inserted breakpoints thereby halting execution of the debuggee.

2. The method of claim 1 further comprising: retrieving, by the debugger upon the user adding the debuggee to a debug session, an identification of the user;
   searching the source code of the debuggee for embedded user identifiers matching the identification of the user, each embedded user identifier
   representing a source code module user assignment; and
   generating, by the debugger, a list of source code modules associated with the user, wherein identifying each routine in a call stack comprising the source code module associated with the user further comprises searching the list for user assignments of each routine in the call stack and inserting, for each of the source code module associated with the user and not in the call stack, a breakpoint at an entry point of the source code module further comprises searching the list for all source code modules assigned to the user.

3. The method of claim 1 further comprising: receiving, by the debugger, the list of source code module user assignments, the list generated by a software development tool upon one or more users' development of the source code of the debuggee, wherein identifying each routine in a call stack comprising the source code module associated with the user further comprises searching the list for user assignments of each routine in the call stack and inserting, for each of the source code module associated with the user and not in the call stack, a breakpoint at an entry point of the source code module further comprises searching the list for all source code modules assigned to the user.

4. An apparatus for user-specific software debugging, the apparatus comprising a computer processor, a computer memory operatively coupled to the computer processor, the computer memory having disposed within it computer program instructions that when executed by the computer processor cause the apparatus to operate as a debugger and carry out the steps of:
   receiving, from a user, a command to step execution of a debuggee to a source code module of the debuggee associated with the user;
   responsive to the command:
   receiving, by the debugger a list of source code module user assignments, the list generated by one or more users during software development prior to the debug session, wherein identifying each routine in a call stack comprising the source code module associated with the user further comprises searching the list for user assignments of each routine in the call stack
   inserting, for each routine comprising the source code module associated with the user, a breakpoint at each line of source code of the routine;
   inserting, for each of the source code module associated with the user and not in the call stack, a breakpoint at an entry point of the source code module further comprises searching the list for all source code modules assigned to the user; and executing the debuggee until the debuggee encounters one of the inserted breakpoints thereby halting execution of the debuggee.

5. The apparatus of claim 4 further comprising computer program instructions that, when executed by the computer processor, cause the apparatus to carry out the steps of:

retrieving, by the debugger upon the user adding the debuggee to a debug session, an identification of the user;

searching the source code of the debuggee for embedded user identifiers matching the identification of the user, each embedded user identifier representing a source code module user assignment; and generating, by the debugger, a list of source code modules associated with the user, wherein identifying each routine in a call stack comprising the source code module associated with the user further comprises searching the list for user assignments of each routine in the call stack and inserting, for each of the source code module associated with the user and not in the call stack, a breakpoint at an entry point of the source code module further comprises searching the list for all source code modules assigned to the user.

6. The apparatus of claim 4 further comprising computer program instructions that, when executed by the computer processor, cause the apparatus to carry out the steps of:

receiving, by the debugger, the list of source code module user assignments, the list generated by a software development tool upon one or more users' development of the source code of the debuggee, wherein identifying each routine in a call stack comprising the source code module associated with the user further comprises searching the list for user assignments of each routine in the call stack and inserting, for each of the source code module associated with the user and not in the call stack, a breakpoint at an entry point of the source code module further comprises searching the list for all source code modules assigned to the user.

7. A computer program product for user-specific software debugging, the computer program product disposed upon a non-transitory computer readable medium, the computer program product comprising computer program instructions that, when executed, operate as a debugger to carry out the steps of:

receiving, from a user, a command to step execution of a debuggee to a source code module of the debuggee associated with the user;

responsive to the command:

receiving, by the debugger a list of source code module user assignments, the list generated by one or more users during software development prior to the debug session, wherein identifying each routine in a call stack comprising the source code module associated with the user further comprises searching the list for user assignments of each routine in the call stack inserting, for each routine comprising the source code module associated with the user, a breakpoint at each line of source code of the routine;

inserting, for each of the source code module associated with the user and not in the call stack, a breakpoint at an entry point of the source code module further comprises searching the list for all source code modules assigned to the user; and executing the debuggee until the debuggee encounters one of the inserted breakpoints thereby halting execution of the debuggee.

* * * * *